United States Patent
Li et al.

(10) Patent No.: US 10,667,267 B2
(45) Date of Patent: May 26, 2020

(54) TRAFFIC-PRIORITY-BASED TRANSMISSION POWER FALLBACK FOR INTERFERENCE MITIGATION

(71) Applicant: QUALCOMM Incorporated, San Diego, CA (US)

(72) Inventors: Chong Li, Weehawken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 15/388,324

(22) Filed: Dec. 22, 2016

(65) Prior Publication Data

US 2018/0184431 A1 Jun. 28, 2018

(51) Int. Cl.
*H04W 72/04* (2009.01)
*H04W 52/24* (2009.01)
(Continued)

(52) U.S. Cl.
CPC ..... *H04W 72/0473* (2013.01); *H04W 52/243* (2013.01); *H04W 52/245* (2013.01);
(Continued)

(58) Field of Classification Search
CPC ........... H04W 72/0473; H04W 72/082; H04W 72/042; H04W 72/10
See application file for complete search history.

(56) References Cited

U.S. PATENT DOCUMENTS

| 2009/0017850 A1 | 1/2009 | Jovicic et al. |
| 2010/0098008 A1 | 4/2010 | Ishii et al. |
| 2011/0092219 A1 | 4/2011 | Damnjanovic et al. |
| 2015/0201388 A1 | 7/2015 | Cheng et al. |
| 2016/0037530 A1 | 2/2016 | Peng et al. |

(Continued)

FOREIGN PATENT DOCUMENTS

WO WO2015028884 A2 3/2015

OTHER PUBLICATIONS

ISA/EP, International Search Report and Written Opinion of the International Searching Authority, Int'l Application No.—PCT/US2017/063316, dated Feb. 21, 2018, European Patent Office, Rijswijk, Nl, 16 pgs.
(Continued)

*Primary Examiner* — Jackie Zuniga Abad
(74) *Attorney, Agent, or Firm* — Holland & Hart LLP

(57) ABSTRACT

Methods, systems, and devices for wireless communication are described to provide priority traffic grant-less access to pre-defined communication resources that are semi-persistently scheduled. A set of semi-persistent communication resources may be reserved for use by priority traffic. If the semi-persistent resources are not used for priority traffic, the semi-persistent resources may be scheduled for use by other types of traffic. As priority traffic is identified, the priority traffic may be transmitted using the semi-persistent resource without having those communication resources granted by a scheduling entity. Such grant-less access to the semi-persistent resources may result in collisions between the scheduled traffic and the priority traffic. To mitigate interference between different traffic types, the scheduled traffic may be transmitted using a transmission power that ensures an interference parameter indicative of an amount of interference imposed by the scheduled traffic on the priority traffic satisfies an interference threshold.

30 Claims, 11 Drawing Sheets

(51) Int. Cl.
  *H04W 52/34* (2009.01)
  *H04W 72/12* (2009.01)
  *H04W 52/28* (2009.01)
  *H04W 52/36* (2009.01)
  *H04W 72/08* (2009.01)
  *H04W 72/10* (2009.01)

(52) U.S. Cl.
  CPC ......... *H04W 52/281* (2013.01); *H04W 52/34* (2013.01); *H04W 52/367* (2013.01); *H04W 72/042* (2013.01); *H04W 72/082* (2013.01); *H04W 72/10* (2013.01); *H04W 72/1242* (2013.01)

(56) References Cited

U.S. PATENT DOCUMENTS

| | | | |
|---|---|---|---|
| 2016/0128004 A1 | 5/2016 | Lee et al. | |
| 2016/0270102 A1 | 9/2016 | Zeng et al. | |
| 2017/0303215 A1* | 10/2017 | Kim | H04W 52/48 |
| 2017/0367110 A1* | 12/2017 | Li | H04W 72/1268 |
| 2018/0027576 A1* | 1/2018 | Kowalski | H04W 72/0406 370/329 |

OTHER PUBLICATIONS

Nokia et al., "Enhanced Semi-Persistent Scheduling for 5G URLLC," 3GPP TSG-RAN WG1 Meeting #87, R1-1612251, Reno. USA. Nov. 14-18, 2016, 8 pgs., XP051190365, 3rd Generation Partnership Project.

* cited by examiner

TRAFFIC-PRIORITY-BASED TRANSMISSION POWER FALLBACK FOR INTERFERENCE MITIGATION

BACKGROUND

The following relates generally to wireless communication, and more specifically to traffic-priority-based transmission power fallback for interference mitigation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Multiple types of traffic may be communicated in a wireless communication system. In some cases, different performance metrics of the different types of traffic may cause some types of traffic to have a higher priority than others. One example of a type of traffic in a wireless communication system may include ultra-reliability low-latency communications (URLLC), also sometimes referred to as mission-critical communications, which may specify that packets are communicated with low latency and with high-reliability. URLLC or mission-critical communications may be examples of communications having a high priority, or a priority that is above a threshold. Low priority communications include communications that have a priority that is below a threshold. Examples of communications having a priority level that is less than that of URLLC or mission-critical communications include enhanced mobile broadband (eMBB) communications. A wireless communication system may designate resources to be used for various types of communications, such as high priority or low priority traffic.

SUMMARY

The described techniques relate to improved methods, systems, devices, or apparatuses that support traffic-priority-based transmission power fallback for interference mitigation. Generally, the described techniques provide priority traffic grant-less access to pre-defined communication resources that are semi-persistently scheduled. A set of semi-persistent communication resources may be reserved for use by priority traffic. If the semi-persistent resources are not used for priority traffic, the semi-persistent resources may be scheduled for use by other types of traffic. As priority traffic is identified, the priority traffic may be transmitted using the next available semi-persistent resource without having those communication resources granted by a scheduling entity. Such grant-less access to the semi-persistent resources may result in collisions between the scheduled traffic and the priority traffic. To mitigate interference between different traffic types, the scheduled traffic may be transmitted using a transmission power that is configured such that an interference parameter indicative of an amount of interference imposed by the scheduled traffic on the priority traffic satisfies an interference threshold.

A method of wireless communication is described. The method may include identifying semi-persistent resources reserved for use by traffic of a first priority and transmitting an assignment of communication resources in a grant, the communication resources at least partially overlapping with the semi-persistent resources and to be used for traffic of a second priority, the second priority being lower than the first priority, wherein the grant indicates a maximum transmission power for the traffic of the second priority, the maximum transmission power for the traffic of the second priority being configured such that an interference parameter indicative of an amount of interference imposed by the traffic of the second priority on the traffic of the first priority satisfies an interference threshold.

An apparatus for wireless communication is described. The apparatus may include means for identifying semi-persistent resources reserved for use by traffic of a first priority and means for transmitting an assignment of communication resources in a grant, the communication resources at least partially overlapping with the semi-persistent resources and to be used for traffic of a second priority, the second priority being lower than the first priority, wherein the grant indicates a maximum transmission power for the traffic of the second priority, the maximum transmission power for the traffic of the second priority being configured such that an interference parameter indicative of an amount of interference imposed by the traffic of the second priority on the traffic of the first priority satisfies an interference threshold.

Another apparatus for wireless communication is described. The apparatus may include a processor, memory in electronic communication with the processor, and instructions stored in the memory. The instructions may be operable to cause the processor to identify semi-persistent resources reserved for use by traffic of a first priority and transmit an assignment of communication resources in a grant, the communication resources at least partially overlapping with the semi-persistent resources and to be used for traffic of a second priority, the second priority being lower than the first priority, wherein the grant indicates a maximum transmission power for the traffic of the second priority, the maximum transmission power for the traffic of the second priority being configured such that an interference parameter indicative of an amount of interference imposed by the traffic of the second priority on the traffic of the first priority satisfies an interference threshold.

A non-transitory computer readable medium for wireless communication is described. The non-transitory computer-readable medium may include instructions operable to cause a processor to identify semi-persistent resources reserved for use by traffic of a first priority and transmit an assignment of communication resources in a grant, the communication resources at least partially overlapping with the semi-persistent resources and to be used for traffic of a second priority, the second priority being lower than the first priority, wherein the grant indicates a maximum transmission power for the traffic of the second priority, the maximum transmission power for the traffic of the second priority being configured such that an interference parameter indicative of an amount of interference imposed by the traffic of the second priority on the traffic of the first priority satisfies an interference threshold.

Some examples of the method, apparatus, and non-transitory computer-readable medium described above may further include processes, features, means, or instructions for determining the maximum transmission power for the traffic of the second priority to be transmitted when using the communication resources that may be at least partially overlapping with the semi-persistent resources based at least in part on an expected reception power of the traffic of the first priority.

Some examples of the method, apparatus, and non-transitory computer-readable medium described above may further include processes, features, means, or instructions for establishing a communication link with a user equipment (UE). Some examples of the method, apparatus, and non-transitory computer-readable medium described above may further include processes, features, means, or instructions for identifying that the UE may be a mission critical UE capable of generating traffic of the first priority, wherein identifying the semi-persistent resources may be based at least in part on the UE being a mission critical UE.

Some examples of the method, apparatus, and non-transitory computer-readable medium described above may further include processes, features, means, or instructions for identifying a plurality of maximum transmission powers associated with the semi-persistent resources. Some examples of the method, apparatus, and non-transitory computer-readable medium described above may further include processes, features, means, or instructions for assigning one of the plurality of maximum transmission powers to the traffic of the second priority as part of the grant, wherein the assigned maximum transmission power may be based at least in part on an expected reception power of the traffic of the first priority.

Some examples of the method, apparatus, and non-transitory computer-readable medium described above may further include processes, features, means, or instructions for dividing a coverage area into resources pools based at least in part on a user equipment (UE) being capable of generating traffic of the first priority. Some examples of the method, apparatus, and non-transitory computer-readable medium described above may further include processes, features, means, or instructions for identifying the semi-persistent resources for the resource pool that may be associated with the UE.

Some examples of the method, apparatus, and non-transitory computer-readable medium described above may further include processes, features, means, or instructions for receiving the traffic of the first priority using at least a portion of the communication resources granted to the traffic of the second priority in the grant.

Some examples of the method, apparatus, and non-transitory computer-readable medium described above may further include processes, features, means, or instructions for identifying that the traffic of the second priority scheduled to be received using the communication resources that may be at least partially overlapping with the semi-persistent resources was not received. Some examples of the method, apparatus, and non-transitory computer-readable medium described above may further include processes, features, means, or instructions for rescheduling the traffic of the second priority.

Some examples of the method, apparatus, and non-transitory computer-readable medium described above may further include processes, features, means, or instructions for generating a data field indicating which of the communication resources may be the semi-persistent resources reserved for use by traffic of the first priority.

Some examples of the method, apparatus, and non-transitory computer-readable medium described above may further include processes, features, means, or instructions for transmitting, via a physical downlink control channel (PDCCH), the data field to a user equipment (UE) capable of generating traffic of the first priority as part of downlink control information.

Some examples of the method, apparatus, and non-transitory computer-readable medium described above may further include processes, features, means, or instructions for transmitting the data field to a user equipment (UE) as part of the grant of the communication resources.

Some examples of the method, apparatus, and non-transitory computer-readable medium described above may further include processes, features, means, or instructions for receiving an indication from a first user equipment (UE) that the first UE may be capable of generating traffic of the first priority, wherein identifying the semi-persistent resources occurs after receiving the indication.

Some examples of the method, apparatus, and non-transitory computer-readable medium described above may further include processes, features, means, or instructions for transmitting a message to the first UE that indicates the semi-persistent resources being reserved for use by traffic of the first priority.

Some examples of the method, apparatus, and non-transitory computer-readable medium described above may further include processes, features, means, or instructions for receiving a second indication from a second UE that the second UE may be capable of generating traffic of the first priority. Some examples of the method, apparatus, and non-transitory computer-readable medium described above may further include processes, features, means, or instructions for identifying additional semi-persistent resources based at least in part on receiving the second indication.

Some examples of the method, apparatus, and non-transitory computer-readable medium described above may further include processes, features, means, or instructions for comparing the semi-persistent resources reserved for use by traffic of the first priority to a semi-persistent resource threshold based at least in part on receiving the indication, wherein additional semi-persistent resources may be not reserved based at least in part on the semi-persistent resources satisfying the semi-persistent resource threshold.

In some examples of the method, apparatus, and non-transitory computer-readable medium described above, the traffic of the first priority may be low-latency traffic.

DETAILED DESCRIPTION

Figure 1:
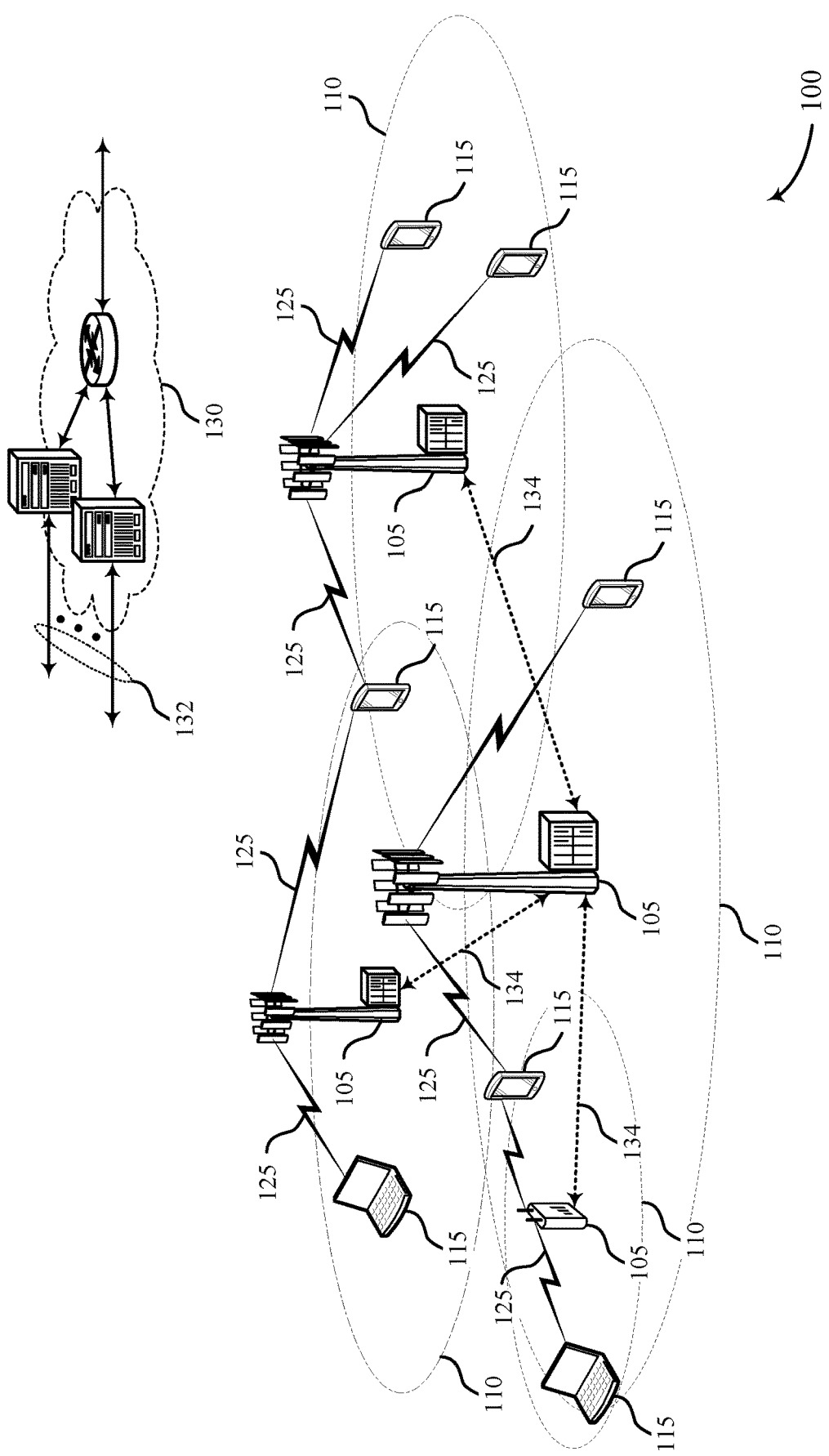
FIG. 1 illustrates an example of a system for wireless communication that supports traffic-priority-based transmission power fallback for interference mitigation in accordance with aspects of the present disclosure.

Wireless communication systems may communicate multiple types of traffic having different performance metrics or performance requirements. The different performance metrics of the different types of traffic may have competing aims that do not always work well together. For example, some types of applications may use the wireless communication system for high-throughput applications where large amounts of data are communicated (e.g., downloading a large file). Other types of applications may use the wireless communication system for low-latency applications where the delivery speed of individual packets is a prime consideration (e.g., self-driving vehicles). Such different considerations and performance metrics may, at times, place conflicting demands for use on a wireless communication system.

Techniques are described herein to provide priority traffic grant-less access to pre-defined communication resources that are semi-persistently scheduled. A set of semi-persistent communication resources may be reserved for use by priority traffic. If the semi-persistent resources are not used for priority traffic, the semi-persistent resources may be scheduled for use by other types of traffic. As priority traffic is identified, the priority traffic may be transmitted using the next available semi-persistent resource without having those communication resources granted by a scheduling entity. Such grant-less access to the semi-persistent resources may result in collisions between the scheduled traffic and the priority traffic communicated without first scheduling the specific communication resources. To mitigate interference between different traffic types, the scheduled traffic may be transmitted using a transmission power that is configured such that an interference parameter indicative of an amount of interference imposed by the scheduled traffic on the priority traffic satisfies an interference threshold. In some examples, the scheduled traffic may be transmitted using a transmission power that is configured such that an interference parameter defined by a reception power of the priority traffic and a reception power of the scheduled traffic satisfies an interference threshold. In some examples, the scheduled traffic may be transmitted using a transmission power that is configured such that a reception power of the scheduled traffic is less than a reception power of the priority traffic. In some examples, the scheduled traffic may be transmitted using a transmission power that is less than a transmission power of the priority traffic.

By providing priority traffic grant-less access to semi-persistent resources, the priority traffic (e.g., low-latency traffic) may be able to arrive within a time-frame specified by its performance metrics. Scheduling other types of traffic with a maximum transmission power allows other types of traffic to use the semi-persistent resources without unduly comprising the priority traffic's ability to arrive at its destination within its performance metrics. For example, the maximum transmission power of the scheduled traffic may be less than an expected transmission power of the priority-traffic. In this manner, the priority traffic may overpower the other traffic if both are using the same communication resources.

Aspects of the disclosure are initially described in the context of a wireless communications system. Aspects of the disclosure are illustrated by and described with reference to resource structures and process flows that relate to traffic-priority-based transmission power fallback for interference mitigation. Aspects of the disclosure are further illustrated by and described with reference to apparatus diagrams, system diagrams, and flowcharts that relate to traffic-priority-based transmission power fallback for interference mitigation.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a LTE (or LTE-Advanced) network, or a New Radio (NR) network. In some cases, wireless communication system 100 may support enhanced broadband communications, ultra-reliable (i.e., mission critical) communications, low latency communications, and communications with low-cost and low-complexity devices. Because these different types of communications have different performance requirements or different performance metrics, in some situations, some of these communications may have priority over other communications. To reduce interference between data that collides, one of the data packets (e.g., the lower-priority traffic) may be transmitted using a power fallback position.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions). The base station 105 may schedule certain communication resources with power fallback positions to reduce interference when collisions between high-priority traffic and low-priority traffic occur.

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. UEs 115 may transmit some traffic using a lower transmission power than normal to reduce interference between high-priority traffic and low-priority traffic when collisions occur.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one S-GW, and at least one P-GW. The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

Wireless communication system 100 may operate in an ultra high frequency (UHF) frequency region using frequency bands from 700 MHz to 2600 MHz (2.6 GHz), although in some cases wireless local-area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference. The power fallback positions may also be used when using narrow beams to communicate data.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten one millisecond subframes numbered from 0 to 9. A subframe may be further divided into two 0.5 millisecond slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain twelve consecutive subcarriers in the frequency domain and, for a normal cyclic prefix in each orthogonal frequency-division multiplexing (OFDM) symbol, seven consecutive OFDM symbols in the time domain (one slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be. In some examples, even a single resource element may be transmitted using a power fallback position.

Figure 2:
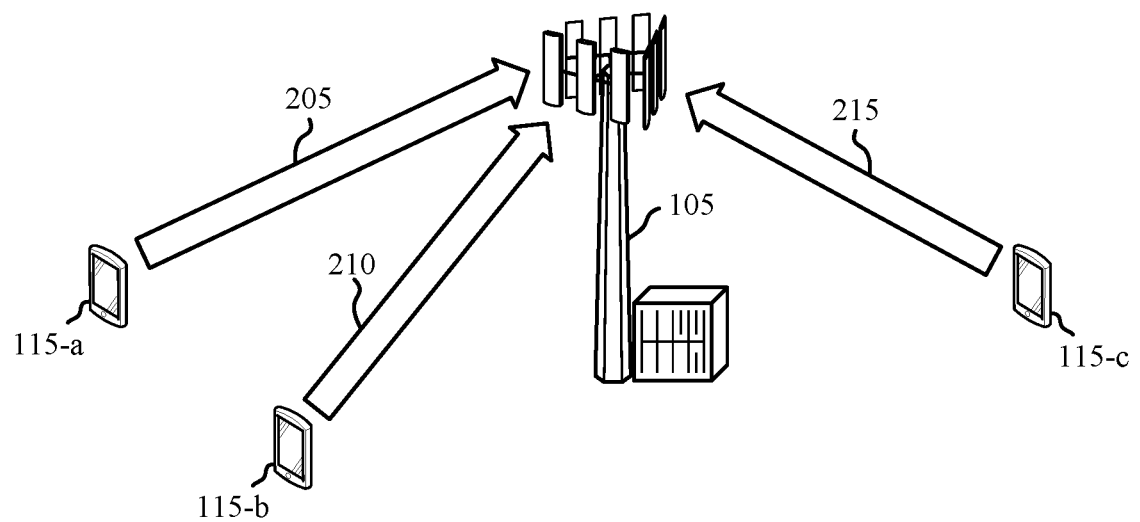
FIG. 2 illustrates an example of a wireless communication system that supports traffic-priority-based transmission power fallback for interference mitigation in accordance with aspects of the present disclosure.

FIG. 2 illustrates an example of a wireless communication system 200 for traffic-priority-based transmission power fallback for interference mitigation. The wireless communication system 200 may include a base station 105, a UE 115-a, a UE 115-b, and a UE 115-c. The UEs 115-a, 115-b, 115-c may send data transmissions 205, 210, 215 to the base station 105 using communication resources such as frequency resources and time-based resources. In the illustrative example, the UE 115-a may be associated with high-priority traffic and the UEs 115-b, 115-c may be associated with low-priority traffic. In some scenarios, the data transmission 205, 210, 215 may interfere or collide with one another, which may prevent some data from reaching the base station. Some of the interference between data transmission may be caused at least in part by multiple types of traffic being communicated using the same communication resources.

Multiple types of traffic may be communicated in the wireless communication system 200. Different types of traffic may have different performance metrics or requirements. In some cases, the different performance metrics may cause some types of traffic to have a higher priority than others. For example, ultra-reliability low-latency communications (URLLC) may require that packets are communicated with low latency (e.g., within 500 microseconds of detection) and with high-reliability. As such, URLLC traffic may have priority over other types of traffic in the wireless communication system 200. Other types of network traffic may include mobile broadband traffic, enhanced mobile broadband (eMBB) traffic, or machine-to-machine traffic. High-priority traffic (e.g., URLLC traffic) may include network traffic related to a smart electrical grid, industrial automation, augmented reality applications, or may be used in automotive and aviation applications (e.g., self-driving vehicles). Some resource allocation procedures used in a wireless communication system may be unable to satisfy the low-latency and high reliability performance metrics of high-priority traffic.

To satisfy some performance metrics, high-priority traffic may be given grant-less access to certain resources that are semi-persistently scheduled. Grant-less access may refer to a situation where a UE 115 may use the communication resources without requesting resources from the base station 105 or receiving a resource grant from the base station. For example, in some cases, rather than requesting resources the UE 115-a may transmit high-priority traffic (e.g., data transmission 205) using the next-available semi-persistent resources. Furthermore, when not being used by high-priority traffic, a base station 105 may schedule the resources to be used by low-priority traffic (e.g., data transmission 215). Grant-less communication, however, may result in collisions between low-priority traffic scheduled to use the semi-persistent resources (e.g., data transmission 215) and the high-priority traffic communicated without first scheduling specific resources (e.g., data transmission 205). If such collisions occur, the high-priority traffic may not arrive at or may not be successfully received by the base station. If the high-priority traffic is not received by the base station 105, the communication may also fail to satisfy the reliability performance metrics of high-priority traffic.

To mitigate interference when collisions occur, the scheduled low-priority traffic (e.g., data transmission 215) may be transmitted using a transmission power that is configured such that an interference parameter indicative of an amount of interference imposed by the low-priority traffic on the high-priority traffic (e.g., data transmission 205) satisfies an interference threshold. In some examples, the transmission power of the low-priority traffic may be configured such that a reception power of the low-priority traffic is less than a reception power of the high-priority traffic. In this manner, even if the high-priority traffic and the low-priority traffic were transmitted using the same resources, the higher transmission power of the high-priority traffic may overpower the scheduled low-priority traffic. As such, the high-priority traffic may therefore be successfully received by the base station 105 while the low-priority traffic is not received by the base station. When granting low-priority traffic access to semi-persistent resources, a base station 105 may indicate the transmission power along with the grant for the semi-persistent resources.

As used herein, the term "traffic" may refer to any information moving being communicated between entities in a communication system. For example, traffic may refer to data, packets, communications, messages, indications, signals, or other types of data that may be communicated via a communication system.

As used herein, the term "high-priority traffic" may refer to data that is able to take precedence over other types of traffic. The term "low-priority traffic" may refer to the other types of traffic that are not able to take precedence. To illustrate the use of the term priority, in some wireless communication systems, all traffic may be treated equally. For example, traffic may be transmitted based on the order that the traffic requested transmission. During heavy traffic periods, however, there may be a delay between a request to transmit data and actual transmission of the data. In some examples, high priority traffic may refer to traffic that is capable of being transmitted before other types of traffic that may have requested the resources first. In some examples, high-priority traffic may be identified based on performance metrics associated with the high-priority traffic. In some instances, the high-priority traffic is low-latency traffic that includes a performance metric indicating that the traffic should be received by its intended recipient within a certain period of time. In some examples, high-priority traffic may be referred to as traffic of a first priority and the low-priority traffic may be referred to as traffic of a second priority, where the second priority is lower than the first priority.

The wireless communication system 200 may be an example of the wireless communication system 100 described with reference to FIG. 1. While only a single base station 105 and three UEs 115 are depicted, the wireless communication system 200 may include any number of base station 105 and/or UEs 115, among other components. The base station 105 may be an example of the base stations 105 described with reference to FIG. 1. The UEs 115-a, 115-b, 115-c be examples of the UEs 115 described with reference to FIG. 1.

Figure 3A:
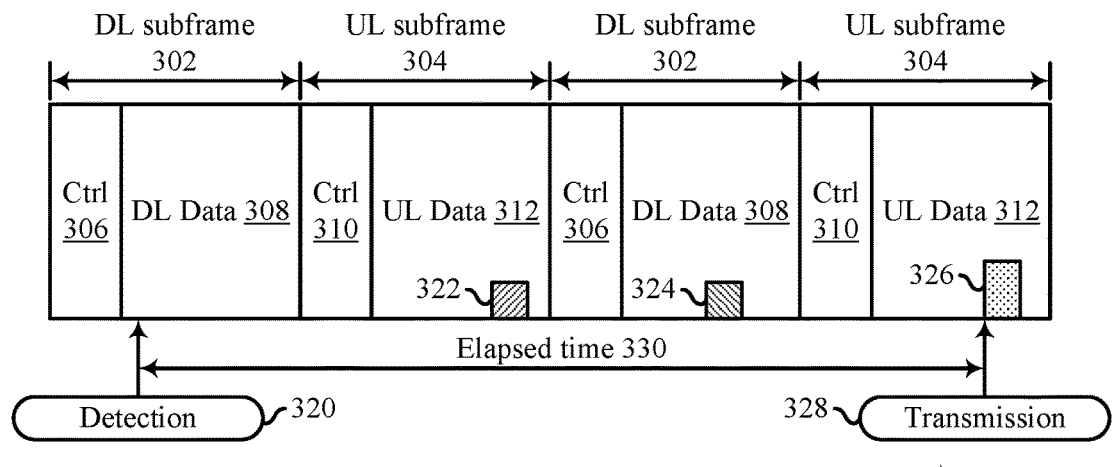
FIGS. 3A-3C illustrates examples of resource structures that support traffic-priority-based transmission power fallback for interference mitigation in accordance with aspects of the present disclosure.

FIG. 3A illustrates an example of a resource structure 300 for traffic-priority-based transmission power fallback for interference mitigation. The resource structure 300 shows an example of a resource allocation procedure of a wireless communication system. The resource structure 300 may include a number of subframes, such as downlink (DL) subframes 302 and uplink (UL) subframes 304. The subframes 302, 304 may comprise a set of frequency resources over a period of time. The DL subframes 302 may include a control portion 306 and a data portion 308. In some examples, the control portion 306 may be a physical downlink control channel (PDCCH) and the data portion 308 may be a physical downlink shared channel (PDSCH). The UL subframes 304 may include a control portion 310 of communication resources and a data portion 312 of communication resources. In some examples, the control portion 310 may be a physical uplink control channel (PUCCH) and the data portion 312 may be a physical uplink shared channel (PUSCH).

Some resource allocation procedures may include: (1) detecting high-priority data to be transmitted, (2) transmitting a scheduling request to a base station 105 requesting communication resources, (3) receiving a resource grant from the base station, and (4) transmitting the data using the resources indicated by the resource grant. Thus, up to four cycles (e.g., subframes) may occur between the detection of data at a UE 115-a and when the data is transmitted by the UE, which may exceed the performance metrics of certain high-priority traffic. In some cases, such a procedure may take up to ten milliseconds for the base station 105 to receive the high-priority traffic, much greater than the 500 microseconds associated with some low-latency communications.

Resource structure 300 illustrates an example of a resource allocation procedure that may occur in the context of resource structures depicted. At time 320, the UE 115-a (e.g., a UE capable of generating high-priority traffic) may detect or identify data to be transmitted to the base station 105. In some examples, the data may be high-priority data. The data may be generated at the UE 115-a or it may be received from other network entities in other communications (e.g., a device-to-device communication between UEs or from another base station).

After identifying the data to be transmitted, the UE 115-a may transmit a scheduling request 322 to the base station 105 during a UL subframe 304. The scheduling request 322 may indicate that the UE 115-a has data to be transmitted to the base station 105. In addition, the scheduling request 322 may indicate characteristics of the data requesting transmission, such as the size of the data, performance metrics associated with the type of data, or combinations thereof.

The base station 105 may transmit a resource grant 324 to the UE 115-a during a DL subframe 302. The resource grant 324 may allocate communication resources (e.g., uplink resources) to the UE 115-a to transmit the data. The UE 115-a may transmit the data 326 to the base station 105 using the communication resources indicated in the resource grant 324. In some examples, the communication resources included in the resource grant 324 may overlap with semi-persistent resources 345.

An elapsed time 330 extends between the detection time 320 and a transmission time 328 of the data 326. If the data 326 was high-priority data, the elapsed time 330 may be longer than a latency performance metric of the data 326 requests that the data be transmitted. For example, a latency performance metric of high-priority data may indicate that the high-priority data should be transmitted to its destination within a certain amount of time from detection, for example, 500 microseconds. The elapsed time 330 associated with scheduling communication resources in the resource allocation procedure may be to 10 milliseconds. To satisfy some performance metrics, high-priority traffic may be given grant-less access to certain resources that are semi-persistently scheduled.

Figure 3B:
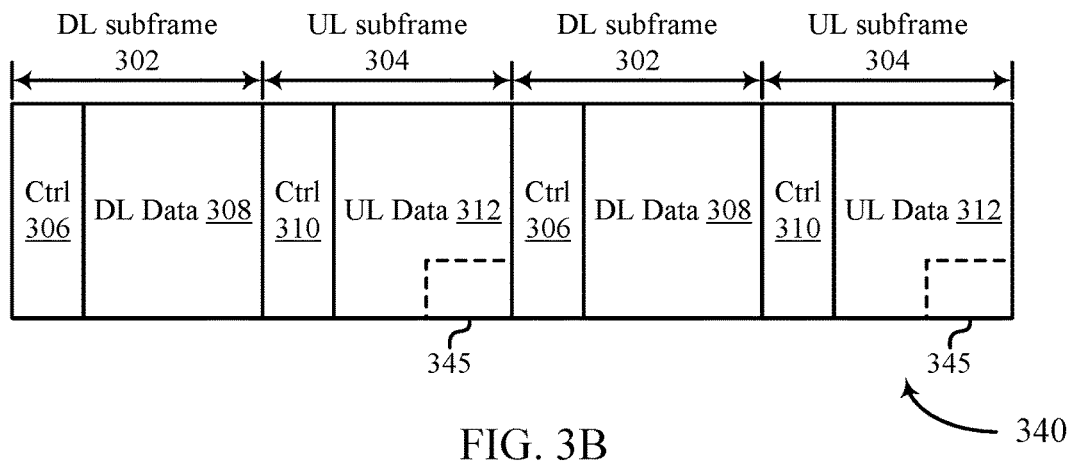

FIG. 3B illustrates an example of a resource structure 340 for traffic-priority-based transmission power fallback for interference mitigation. The resource structure 340 shows how certain communication resources may be identified as semi-persistent resources 345 reserved for use by high-priority traffic. The semi-persistent resources 345 may be predetermined based at least in part on the amount of high-priority traffic that may be handled by the base station 105.

Semi-persistent resources may refer to resources that are reserved for an intended purpose. However, when the semi-persistent resources 345 are not needed for the intended purpose, the semi-persistent resources 345 may be allocated to other purposes. Hence, the resources are semi-persistent rather than persistent. In some cases, the semi-persistent resources may be reserved for use by high-priority traffic such as low-latency packets or URLLC packets. The semi-persistent resources 345 may be selected from uplink resources of the wireless communication system. In some examples, however, semi-persistent resources reserved for high-priority traffic may be selected from downlink resources.

A base station 105 may receive an indication that at least one UE communicating with the base station 105 is capable of generating high-priority traffic (e.g., UE 115-a). The base station 105 may determine semi-persistent resources reserved for the grant-less access of high-priority traffic based on receiving the indication. To ensure that the high-priority traffic arrives using the semi-persistent resources, the base station 105 may limit the transmission power of low-priority traffic scheduled to use the semi-persistent resources. The indication of a lower transmission power to be used for transmission of low-priority traffic may be referred to as a power fallback. In such cases, if high-priority traffic is transmitted at an expected transmission power during the semi-persistent resources, the high-priority traffic may therefore overpower the low-priority traffic resulting in a higher probability that the base station 105 successfully receives the high-priority traffic.

The semi-persistent resources 345 may be selected based on a number of factors. For example, a base station 105 may determine the semi-persistent resources 345 after receiving an indication from a UE 115 that the UE is capable of generating high-priority traffic. The selection of semi-persistent resources 345 may be based on the number of UEs capable of generating high-priority traffic in the coverage area, the locations of those UEs, the total amount of resources available for communication, network traffic and estimated network traffic for the communication system, the amount of non-high-priority traffic, other factors, or combinations thereof.

Figure 3C:
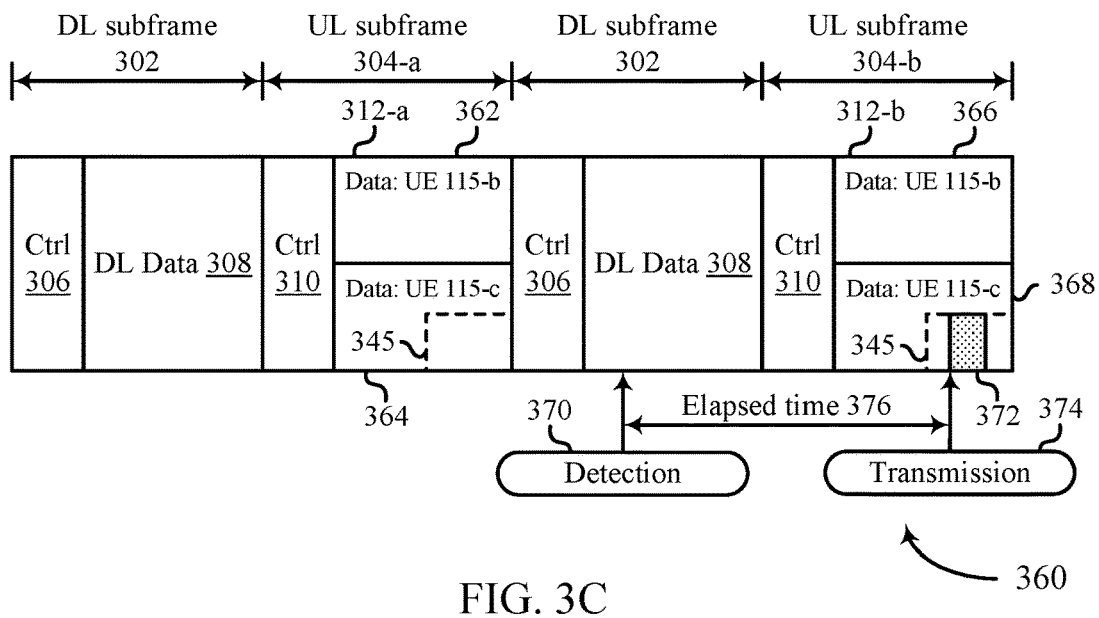

FIG. 3C illustrates an example of a resource structure 360 for traffic-priority-based transmission power fallback for interference mitigation. The resource structure 360 shows an example of a resource allocation procedure of a wireless communication system using semi-persistent resources 345 reserved for high-priority traffic.

As shown in UL subframe 304-a, the base station 105 has allocated uplink communication resources 312-a to data 362 transmitted by UE 115-b and data 364 transmitted by UE 115-c. In the illustrative example, the communication resources allocated to data 364 includes the semi-persistent resources 345 reserved for high-priority traffic. However, high-priority traffic was not transmitted during the semi-persistent resources 345 in UL subframe 304-a. Therefore, no collisions occurred between data 364 and high-priority traffic.

As shown in UL subframe 304-b, the base station 105 has allocated uplink communication resources 312-b to data 366 transmitted by UE 115-b and data 368 transmitted by UE 115-c. In the illustrative example, the communication resources allocated to data 368 includes the semi-persistent resources 345 reserved for high-priority traffic. In the UL subframe 304-b, high-priority traffic 372 was transmitted using the semi-persistent resources 345 resources. Consequently, the data 368 and the high-priority traffic 372 may interfere with one another or collide.

The collision may occur because, at time 370, the UE 115-a may detect or identify high-priority data that is to be transmitted to the base station 105. Upon detecting the high-priority data, the UE 115-a may identify its next-available set of semi-persistent resources 345 to transmit the high-priority data. At time 374, the UE 115-a may transmit the high-priority traffic 372 using the semi-persistent resources 345 of the UL subframe 304-b without receiving a grant of resources from the base station 105. Because data 368 was previously scheduled to use the semi-persistent resources 345 of the UL subframe 304-b, the high-priority traffic 372 and the data 368 may interfere or collide with one another.

To account for such collisions, the transmission powers of the data 364 and the data 368 may be limited to a maximum transmission power that is less than an expected transmission power of the high-priority traffic 372. In some instances, the data 362, 364, 366, 368 may be examples of low-priority traffic. In some cases, the data 364 and/or the data 368 may be high-priority data and the transmission power of data 364 and data 368 may not be limited to a maximum transmission power. In some examples, the base station 105 may schedule data that can only be transmitted at a reduced transmission power level, not to exceed the maximum transmission power associated with the grant of communication resources that at least partially overlap with the semi-persistent resources 345.

Figure 4:
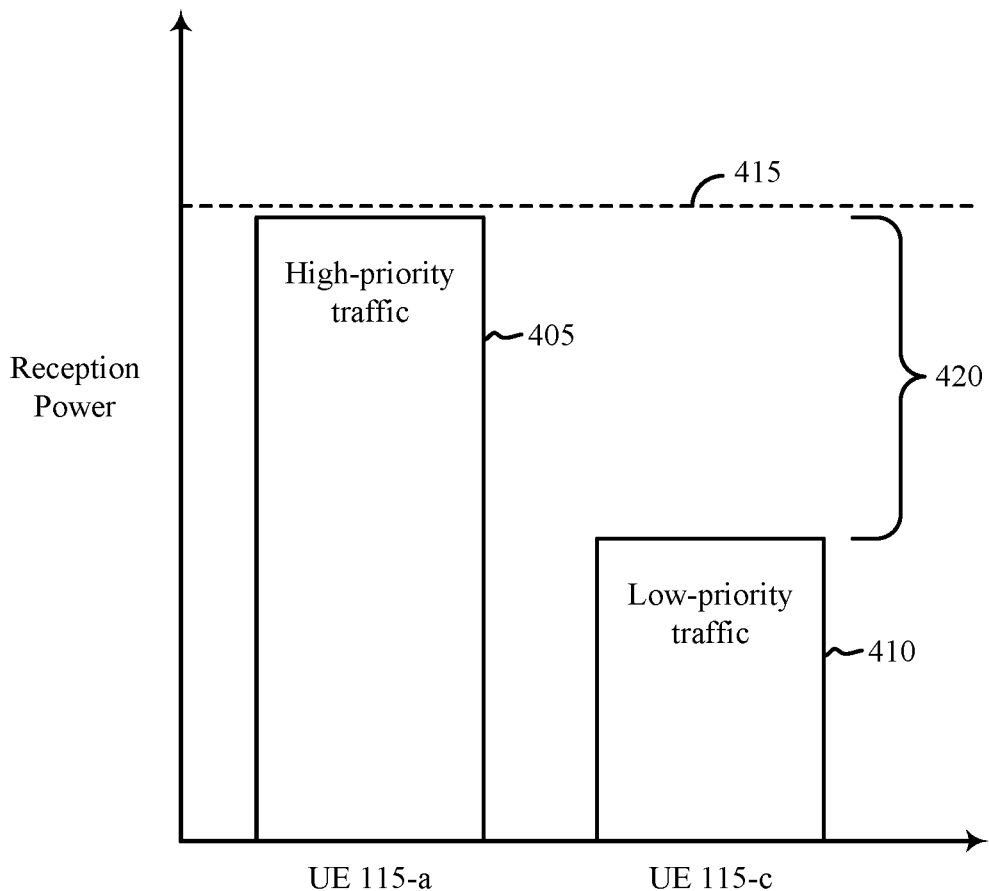
FIG. 4 illustrates examples of reception power levels that support traffic-priority-based transmission power fallback for interference mitigation in accordance with aspects of the present disclosure.

FIG. 4 illustrates an example of reception power levels 400 for traffic-priority-based transmission power fallback for interference mitigation. The reception power levels 400 illustrate an example of a power fallback position for low-priority traffic communicated using the semi-persistent resources 345. The reception power levels 400 illustrate example power levels of communications received by a base station 105 from UEs 115. The reception power levels 400 illustrate examples of both a reception power 405 of high-priority traffic communicated using the semi-persistent resources 345 and a reception power 410 of low priority traffic communicated using the semi-persistent resources 345. In the illustrative example, the high-priority traffic may be generated by UE 115-a and the low-priority traffic may be generated by UE 115-c.

When a base station 105 allocates the semi-persistent resources 345 to be used by low-priority traffic, the base station 105 may indicate a maximum transmission power for the scheduled low-priority traffic. The maximum transmission power may be configured such that an interference parameter 420 defined by the reception power 405 of the high-priority traffic and the reception power 410 of the low-priority traffic at the base station 105 satisfies an interference threshold. The maximum transmission power may be based on an expected reception power 415 of high-priority traffic that may, without scheduling, use the semi-persistent resources 345 at any time. In some examples, the maximum transmission power may be based on an expected transmission power of the high-priority traffic. In some examples, the maximum transmission power may be configured such that the reception power 410 of the low-priority traffic at the base station 105 is less than the reception power 405 of the high-priority traffic at the base station 105.

The interference parameter 420 may be indicative of an amount of interference imposed by the low-priority traffic on the high-priority traffic. The interference parameter 420 may be a difference between the reception power 410 of the low-priority traffic and the reception power 405 of the high-priority traffic. The interference parameter 420 may be expressed as a signal-to-interference-plus-noise ratio (SINR) between the reception power 405 of the high-priority traffic and the reception power 410 of the low-priority traffic. For example, the interference parameter 420 may be 3.1 decibels (dB) indicating that the reception power 405 is greater than the reception power 410. In other examples, the interference parameter 420 may be −1.4 dB indicating that the reception power 405 is less than the reception power 410.

Figure 5:
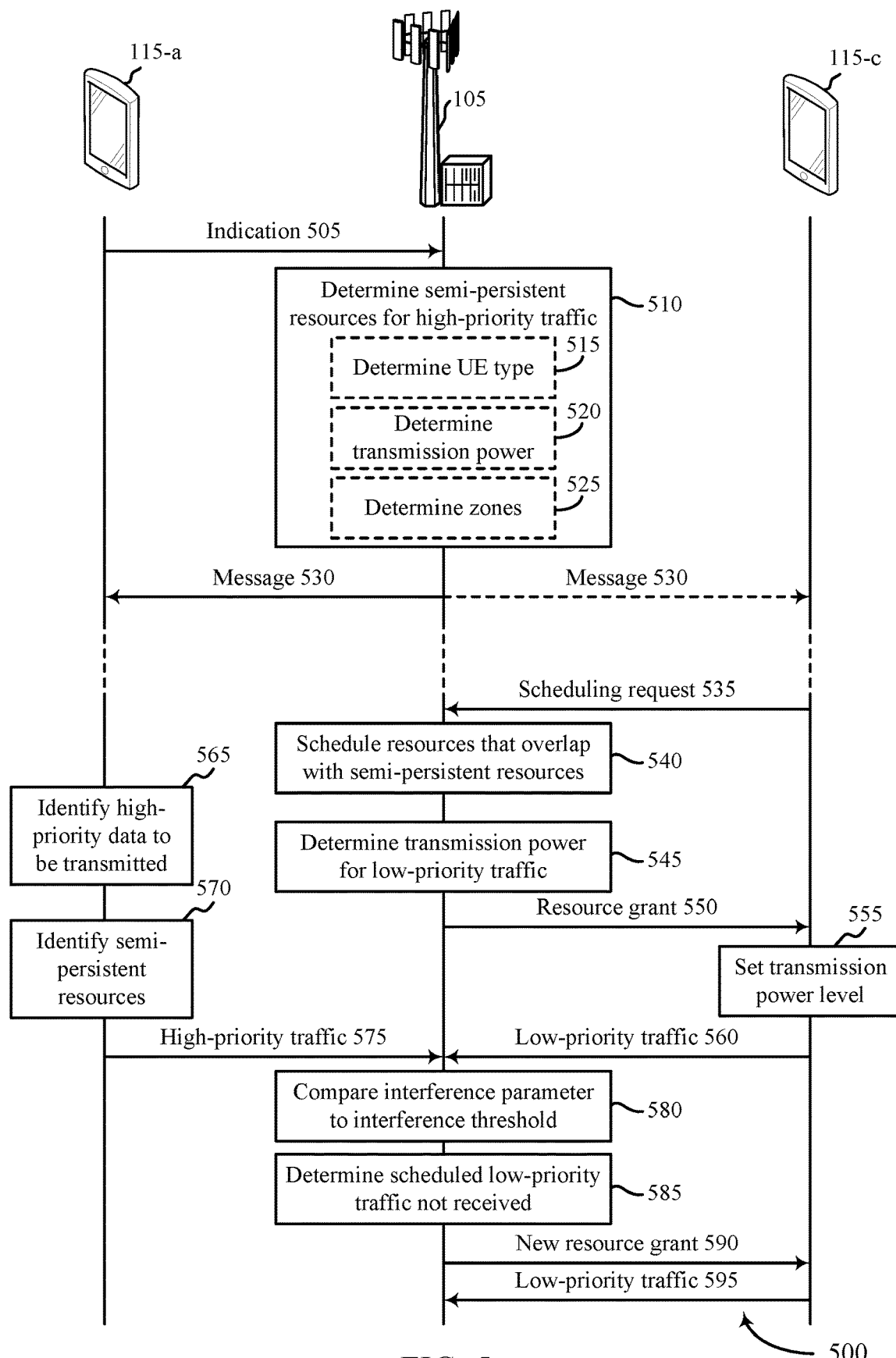
FIG. 5 illustrates an example of a process flow that supports traffic-priority-based transmission power fallback for interference mitigation in accordance with aspects of the present disclosure.

To determine the interference parameter 420, the base station 105 may perform various steps described with more detail with reference to FIG. 5. In some examples, the maximum transmission power of the low-priority traffic may be based on an interference threshold. In some examples, the maximum transmission power may be configured to such that the interference parameter defined by the low-priority traffic and the high-priority traffic satisfies the interference threshold.

In some instances, the maximum transmission power may indicate an upper bound for the transmission power of the scheduled low priority traffic. As such, the transmission power of the low-priority traffic may be a transmission power level that is less than the maximum transmission power. In some instances, the maximum transmission power may indicate a preferred transmission power for the transmission power of the scheduled low-priority traffic. As such, the transmission power of the scheduled low-priority traffic may be based on the maximum transmission power. In this manner, the reception power 410 seen at the base station 105 may be set by the base station 105 via the maximum transmission power being included in the grant of communication of resources.

The maximum transmission power may be set such that, in the event that high-priority traffic and low-priority traffic are both using the semi-persistent resources 345, the base station 105 is capable of decoding the high-priority traffic even in the presence of the low-priority traffic. In some circumstances, low-priority traffic using the semi-persistent resources may be viewed as interference to the high-priority traffic. To ensure the high-priority traffic is decodable, the base station 105 may determine a maximum transmission power for the low-priority traffic using the semi-persistent resources that is configured to maintain the interference parameter 420 above the interference threshold. In some examples, because the reception power 405 is greater than the reception power 410, the base station 105 may be able to decode the high-priority traffic. In case of collisions between traffic of different types using the semi-persistent resources, the maximum transmission power may be set such that a signal of the high-priority traffic overpowers a signal of the low-priority traffic.

In some examples, the maximum transmission power may indicate a transmission power for the low-priority traffic that is higher than the transmission power of the high-priority traffic. Reception power at the base station 105 is based at least in part on both the transmission power of the traffic and the path loss of the traffic as it travels through space. If UE 115-a is close to the base station 105, and consequently has a small pathloss, and UE 115-c is far from the base station 105, and consequently has a large pathloss, the maximum transmission power may indicate that UE 115-c should transmit low-priority traffic with a higher transmission power than UE 115-a may transmit high-priority traffic. In some instances, location data of the UEs 115 may be used to estimate pathloss of traffic. In some examples, the maximum transmission power indicates that a transmission power of the low-priority traffic is less than a transmission power of the high-priority traffic.

FIG. 5 illustrates an example of a process flow 500 for traffic-priority-based transmission power fallback for interference mitigation. The process flow 500 provides examples of how a base station 105, a UE 115-a (e.g., a UE capable of generating high-priority traffic), and a UE 115-c may communicate when the semi-persistent resources 345 are involved.

The UE 115-a, may transmit an indication 505 to the base station 105. The indication 505 may include data that the UE 115-a is capable of generating high-priority traffic. The base station 105 may determine semi-persistent resources associated with high-priority traffic after receiving an indication that at least one UE 115 is capable of generating high-priority traffic. In some examples, the base station 105 may determine semi-persistent resources without receiving the indication 505. In some examples, high-priority traffic is traffic that includes a low-latency performance metric. In some examples, high-priority traffic is URLLC traffic. In some examples, high-priority traffic is traffic generated by a mission-critical UE.

At block 510, the base station 105 may determine semi-persistent resources reserved for use by high-priority traffic. The semi-persistent resources may be an example of the semi-persistent resources 345 described with reference to FIGS. 3B and 3C.

To determine the semi-persistent resources, the base station 105 may identify communication resources in an subframe (e.g., UL subframe 304) that may be designated for high-priority traffic. It should be appreciated that designating communication resources may be different from assigning, allocating, or granting communication resources. The semi-persistent resources may include at least a set of frequency subbands of the subframe over a specific time period. In some examples, the semi-persistent resources may be distributed across non-adjacent frequency subbands of the subframe or across non-adjacent periods of time of the subframe. In some examples, the semi-persistent resources occupy less than all of the communication resources of the subframe. In some examples, semi-persistent resources may also be determined for downlink subframes. As such, it should be appreciated that the functions described herein may be modified to account for differences between downlink operations and uplink operations. For example, the functions performed by the various network entities (e.g., base station 105 or UE 115) may be altered.

The base station 105 may determine semi-persistent resources in a subframe based on a number of factors. The factors may include for example, a type of a UE 115 communicating with the base station 105, the number of UEs communicating with the base station 105, a ratio of UEs capable of generating high-priority traffic to normal UEs, receiving the indications 505 that indicate one or more UEs are capable of generating high-priority traffic, other information or combinations thereof.

For example, at block 515, the base station 105 may determine a type of a UE communicating with the base station. The base station 105 may determine that a UE 115 is a mission-critical UE (e.g., UE 115-a) that is capable of generating high-priority traffic.

In some instances, the base station 105 may receive other indications for other UEs that are also capable of generating high-priority traffic (e.g., mission-critical UEs). The base station 105 may determine which communication resources are dedicated as semi-persistent resources based on receiving these multiple indications. For example, as the number of mission critical UEs increases, the amount of communication resources dedicated as semi-persistent resources may increase. However, at a certain point, no additional semi-persistent resources may be dedicated because the subframe still needs regular (e.g., non-dedicated) communication resources to communicate traffic. To balance semi-persistent resources with normal communication resources in a subframe, the base station 105 may compare the semi-persistent resources reserved for use by high-priority traffic to a semi-persistent resource threshold. The semi-persistent resource threshold may indicate the maximum amount of communication resources that may be dedicated to high-priority traffic. If the semi-persistent resources satisfy the semi-persistent resource threshold, the base station 105 may not reserve additional semi-persistent resources even though additional indications 505 have been received from additional UEs 115.

At block 520, the base station 105 may determine maximum transmission powers associated with the semi-persistent resources. To ensure that high-priority traffic can overpower low-priority traffic in case of a collision, the base station 105 may determine a maximum transmission power for low-priority traffic to be transmitted using communication resources using communication resources that are at least partially overlapping with semi-persistent resources. In some examples, the maximum transmission power may be a set value associated with the semi-persistent resources. In some examples, the maximum transmission power may vary depending on factors associated with the grant of communication resources to be used by low-priority traffic.

In some instances, the maximum transmission power may be determined based on an expected transmission power or an expected reception power of the high-priority traffic. The expected transmission power or the expected reception power of the high-priority traffic may be communicated to the base station 105 by a UE 115 using an indication 505. In some examples, the expected transmission power or the expected reception power of the high-priority traffic may be determined by the base station 105. In such examples, the base station 105 may communicate the expected transmission power or the expected reception power of the high-priority traffic using the configuration message 530. In some examples, the maximum transmission power may be communicated to a UE 115 by the base station 105 using the configuration message 530 or using a resource grant 550, or combinations thereof.

In some examples, the base station 105 may determine a plurality of maximum transmission powers associated with the semi-persistent resources. The base station 105 then may assign one of the plurality of maximum transmission power to the low-priority traffic as part of the grant of communication resources. In some examples, the UE 115 may select which maximum transmission power to include with the grant of communication resources. Multiple power fallback positions provide flexibility in scheduling communication resources for low-priority traffic that overlap with semi-persistent resources.

At block 525, as part of determining semi-persistent resources, the base station 105 may determine zones or resource pools associated with the semi-persistent resources. The term zone may refer to geographic areas of a coverage area associated with semi-persistent resources. Reserving certain resources as semi-persistent resources reduces the amount of communication resources that may be reliably used to communicate normal traffic. In addition, in some situations, high-priority traffic may collide and thereby interfere with one another. To reduce the amount of normal traffic (e.g., low-priority traffic) affected by semi-persistent resources or reduce collisions of high-priority traffic, the base station 105 may determine zones associated with semi-persistent resources pools. For each zone, a certain set of semi-persistent resources may be reserved. When granting communication resources for low-priority traffic, the base station 105 may determine which zone a UE 115 is in. The base station 105 may specify power fallback positions (e.g., maximum transmission powers) for the communication resources that overlap with the semi-persistent resources of the identified zone.

The base station 105 may generate a transmit a configuration message 530 to one or more UEs 115. The configuration message 530 may indicate the semi-persistent resources being reserved for high-priority traffic. The base station 105, transmits the configuration message 530 to a UE capable of generating high-priority traffic (e.g., UE 115-*a*) so that the UE may know which communication resources it has grant-less access to. In some examples, the base station 105 may also transmit the configuration message 530 to other UEs, such as UE 115-*b* or UE 115-*c*. In some implementations, individual UEs 115 may maintain local information regarding the semi-persistent resources and the power fallback positions. Upon receiving a grant of communication resources, the UEs 115 in this situation may compare the granted communication resources to the semi-persistent resources to determine whether they overlap. If an overlap is found, the UEs 115 may determine the maximum transmission power level associated with the overlapping semi-persistent resources.

A data field dedicated to semi-persistent resources may be generated for the configuration message 530. The data field may indicate which communication resources are semi-persistent resources reserved for use by high-priority traffic. The data field may be incorporated into other pre-existing message types. For example, the data field may be integrated into a grant of communication resources (e.g., resource grant 550). In some examples, the data field may be as small as one bit indicating that semi-persistent resources overlap with at least some of the communication resources being granted. In these examples, the UE 115 receiving the grant may then determine which resources overlap with semi-persistent resources and the power fallback positions associated with the semi-persistent resources. In other examples, the data field includes more than one bit and may convey specific information about the semi-persistent resources. For example, which resources overlap and maximum transmission powers for low-priority traffic. In some examples, the data field may be transmitted, by the base station 105, as part of downlink control information via a physical downlink control channel (PDCCH).

Features 505 through 530 of FIG. 5 illustrate an example of a configuration procedure for using semi-persistent resources and power fallback positions to mitigate interference between traffic having different levels of priority. Features 535 through 590 of FIG. 5 illustrate an example of using semi-persistent resources and power fallback positions as part of communication system.

As part of normal communications in a communication system, a UE (e.g., UE 115-*c*) may transmit a scheduling request 535 to a base station 105. The scheduling request 535 may indicate that the UE 115-*c* has data waiting to be transmitted to the base station 105. The scheduling request 535 may include information related to the data to be transmitted, such as the amount of data to be transmitted. In some examples, the scheduling request 535 may include an indication of the priority of the data to be transmitted. For example, the scheduling request 535 may indicate that the data waiting to be transferred is low-priority data. In yet other examples, the scheduling request 535 may indicate performance metrics associated with the data and the base station 105 may then determine the priority of the data based on the performance metrics.

Upon receiving the scheduling request, at block 540, the base station 105 may schedule communication resources that at least partially overlap with the semi-persistent resources. A base station 105 may receive many scheduling requests. Based on a number of criteria, the base station 105 may determine what communication resources to assign to which scheduling requests and UEs or may wait until another cycle to schedule resources for certain requests. In the illustrative example, the scheduled communication resources overlap with the semi-persistent resources. In other examples, the scheduled communication resources may not overlap with the semi-persistent resources. In such an event, the base station 105 and the UEs 115 may not perform the remaining functions shown in FIG. 5.

In some instances, the base station 105 may determine the priority of the data found in the scheduling request 535. In some examples, the base station 105 may make this determination based on information included in the scheduling request 535 such as priority information or performance metrics. To avoid collisions between two items of traffic that both may be consider high-priority or higher-priority, the base station 105 may refrain from scheduling communication resources that overlap with semi-persistent resources to certain types of traffic.

At block 545, the base station 105 may determine a maximum transmission power for low-priority traffic scheduled to use communication resources that at least partially overlap with semi-persistent resources. The maximum transmission power may be based on the semi-persistent resources that overlap, the type of traffic waiting to be transmitted by the UE 115-*c*, an expected reception power of UE 115-*a*, other factors, or combinations thereof.

The bases station 105 may generate and transmit a resource grant 550. The resource grant 550 may assign communication resources to a UE 115-*c*. In some examples the communication resources assigned may overlap with semi-persistent resources reserved for high-priority traffic. The resource grant 550 may include a data field indicating that at least some of the communication resources overlap with semi-persistent resources. In some examples, the resource grant 550 indicates which resources in the grant are semi-persistent resources. In other examples, the resource grant 550 identifies the semi-persistent resources generally. The resource grant 550 may also include an indication of a maximum transmission power associated with the transmission resources.

Upon receiving the resource grant 550, at block 555, the UE 115-*c* may set a transmission power level of the data waiting to be transmitted based on the maximum transmission power associated with the semi-persistent resources. In some examples, the UE 115-c may determine whether the data waiting to be transmitted is low-priority traffic or the UE 115-c may determine whether assigned communication resources overlap with semi-persistent resources. The setting of the transmission power level may be based on one or both of these determinations.

The UE 115-c may transmit low-priority traffic 560 to the base station 105 using the communication resources included in the resource grant 550. The low-priority traffic 560 may include at least a portion of the data waiting to be transmitted.

While the UE 115-c is requesting and being granted communication resources, the UE 115-a (which is capable of generating high-priority traffic) may detect high-priority traffic to transmit. At block 565, the UE 115-a may identify high-priority data to be transmitted to the base station 105. The high-priority data may be generated by the UE 115-a or the high-priority data may be received by the UE 115-a. In either example, the high-priority data may include performance metrics specifying that the high-priority data should be received by the base station 105 within a period of time or specifying a reliability parameter associated with the communication.

At block 570, the UE 115-a may identify semi-persistent resources that may be used to transmit the high-priority traffic. In some examples, the UE 115-a identifies the next-available semi-persistent resources for transmitting the high-priority traffic after identifying the high-priority data. In some examples, the high-priority data may be identified and transmitted within the same transmission time interval.

The UE 115-a may transmit the high-priority traffic 575 to the base station 105 using the identified semi-persistent resources. Because the semi-persistent resources overlap with the communication resources assigned to the low-priority traffic 560, the two traffics 560, 575 may collide and thereby interfere with one another as they arrive at the base station 105. The low-priority traffic 560 may be transmitted during a first time duration using a first set of frequency resources. The high-priority traffic 575 may be transmitted during a second time duration using a second set of frequency resources. The second time duration may at least partially overlap with the first time duration and the second set of frequency resources may at least partially overlap with the second set of frequency resources. In some instances, the base station 105 may receive the high-priority traffic 575 using at least a portion of the communication resources granted to the low-priority traffic 560 in the grant.

At block 580, the base station 105 may compare an interference parameter associated with the high-priority traffic 575 and the low-priority traffic 560 to an interference threshold. To determine the interference parameter 420, the base station 105 may measure the reception power level of the high-priority traffic 575 received from the UE 115-a and the reception power level of the low-priority traffic 560 received from the UE 115-c. The base station 105 may subtract the measured reception power associated with low-priority traffic the base station 105 (e.g., the reception power 410) from the measured reception power associated with high-priority traffic (e.g., the reception power 405). In some examples, the base station 105 may compare the reception power levels of traffic received using the same communication resources (e.g., the same semi-persistent resources 345).

After determining the interference parameter 420, the base station 105 may compare the interference parameter 420 to an interference threshold. The interference threshold may be a predetermined threshold or may be dynamically determined by the base station 105. The interference threshold may indicate a difference in reception power levels below which the high-priority traffic may be undecodable by the base station 105. For example, if the reception power 410 becomes too much greater than the reception power 405, the low-priority traffic may overpower the high-priority traffic and the base station 105 may not be able to decode the high-priority traffic. The interference threshold may be expressed in decibels. For example, the interference threshold may be set at −1.5 dB. Such an interference threshold may indicate the reception power of the low-priority traffic may exceed the reception power of the high-priority traffic by no more than 1.5 dB.

The maximum transmission power for the low-priority traffic 560 may be configured such that the reception power of the low-priority traffic 560 and the reception power of the high-priority traffic 575 satisfies the interference threshold. In some instances, a received message may be decoded by the base station 105 even though another message received using the same communication resources had a higher reception power level. For example, the reception power of the low-priority traffic 560 may be greater than the reception power of the high-priority traffic 575 and the base station 105 may still be able to decode the high-priority traffic 575. The interference parameter and the maximum transmission value may be set such that in some instances the low-priority traffic has a higher reception power than the high-priority traffic, but the high-priority traffic is still decodable.

At block 585, the base station 105 may determine whether the low-priority traffic 560 was received or partially received. Because the high-priority traffic 575 is transmitted using a transmission power that is configured such that a reception power of the high-priority traffic 575 is higher than a reception power of the low-priority traffic 560, the base station 105 may receive the high-priority traffic 575 instead of a portion of the low-priority traffic 560. The base station 105 may determine if at least a portion of the low-priority traffic 560 is not received. In some instances, the base station 105 determines whether high-priority traffic 575 was received prior to determining whether low-priority traffic 560 was not received. The base station 105 may determine whether the low-priority traffic scheduled to be received using the communication resources that are at least partially overlapping with the semi-persistent resources was not received.

If the low-priority traffic 560 was not received due to high-priority traffic 575 transmitted using the semi-persistent resources, the base station 105 may grant an assignment of new communication resources for the low-priority traffic 560. The base station 105 may transmit a new resource grant 590 to the UE 115-c that indicates the new communication resources for the low-priority traffic 560. The new resource grant 590 may be an example of the resource grant 550. In some examples, a portion of the low-priority traffic 560 is granted the new communication resources. The UE 115-c may transmit the low-priority traffic 595 to the base station 105. The low-priority traffic 595 may be an example of the low-priority traffic 560. In some examples, the low-priority traffic 595 is a portion of the low-priority traffic 560.

Figure 6:
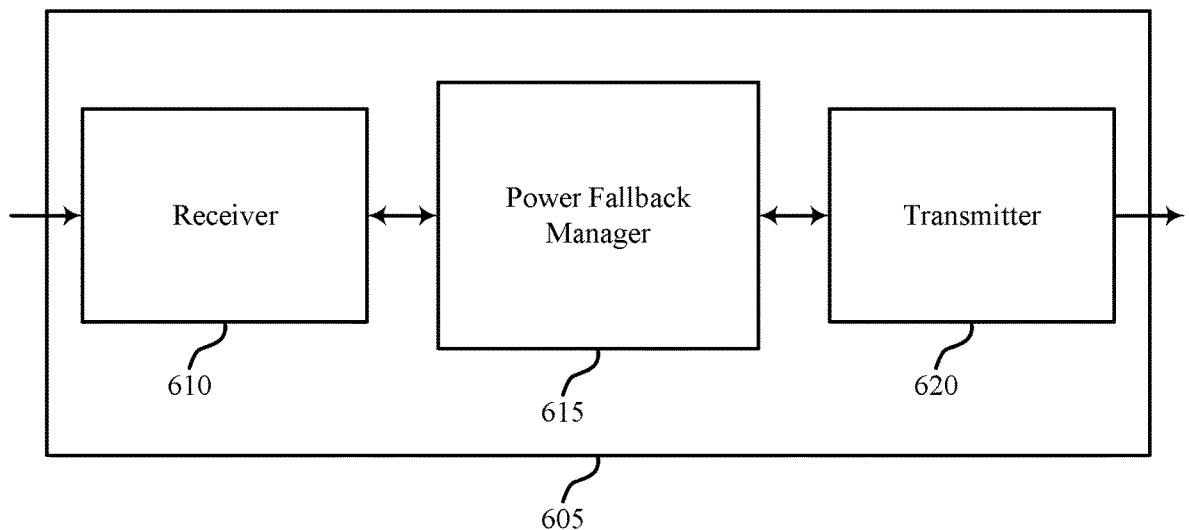
FIGS. 6 through 8 show block diagrams of a device that supports traffic-priority-based transmission power fallback for interference mitigation in accordance with aspects of the present disclosure.

FIG. 6 shows a block diagram 600 of a wireless device 605 that supports traffic-priority-based transmission power fallback for interference mitigation in accordance with various aspects of the present disclosure. Wireless device 605 may be an example of aspects of a base station 105 as described with reference to FIG. 1. Wireless device 605 may include receiver 610, power fallback manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to traffic-priority-based transmission power fallback for interference mitigation, etc.). Information may be passed on to other components of the device. The receiver 610 may be an example of aspects of the transceiver 935 described with reference to FIG. 9.

Power fallback manager 615 may be an example of aspects of the power fallback manager 915 described with reference to FIG. 9. Power fallback manager 615 and/or at least some of its various sub-components may be implemented in hardware, software executed by a processor, firmware, or any combination thereof. If implemented in software executed by a processor, the functions of the power fallback manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The power fallback manager 615 and/or at least some of its various sub-components may be physically located at various positions, including being distributed such that portions of functions are implemented at different physical locations by one or more physical devices. In some examples, power fallback manager 615 and/or at least some of its various sub-components may be a separate and distinct component in accordance with various aspects of the present disclosure. In other examples, power fallback manager 615 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Power fallback manager 615 may identify semi-persistent resources reserved for use by traffic of a first priority and transmit an assignment of communication resources in a grant, the communication resources at least partially overlapping with the semi-persistent resources and to be used for traffic of a second priority, the second priority being lower than the first priority, where the grant indicates a maximum transmission power for the traffic of the second priority, the maximum transmission power for the traffic of the second priority being configured such that an interference parameter indicative of an amount of interference imposed by the traffic of the second priority on the traffic of the first priority satisfies an interference threshold. In some examples, the traffic of the second priority may be transmitted using a transmission power that is configured such that an interference parameter defined by a reception power of the traffic of the first priority and a reception power of the traffic of the second priority satisfies an interference threshold. In some examples, the traffic of the second priority may be transmitted using a transmission power that is configured such that a reception power of the traffic of the second priority is less than a reception power of the traffic of the first priority.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
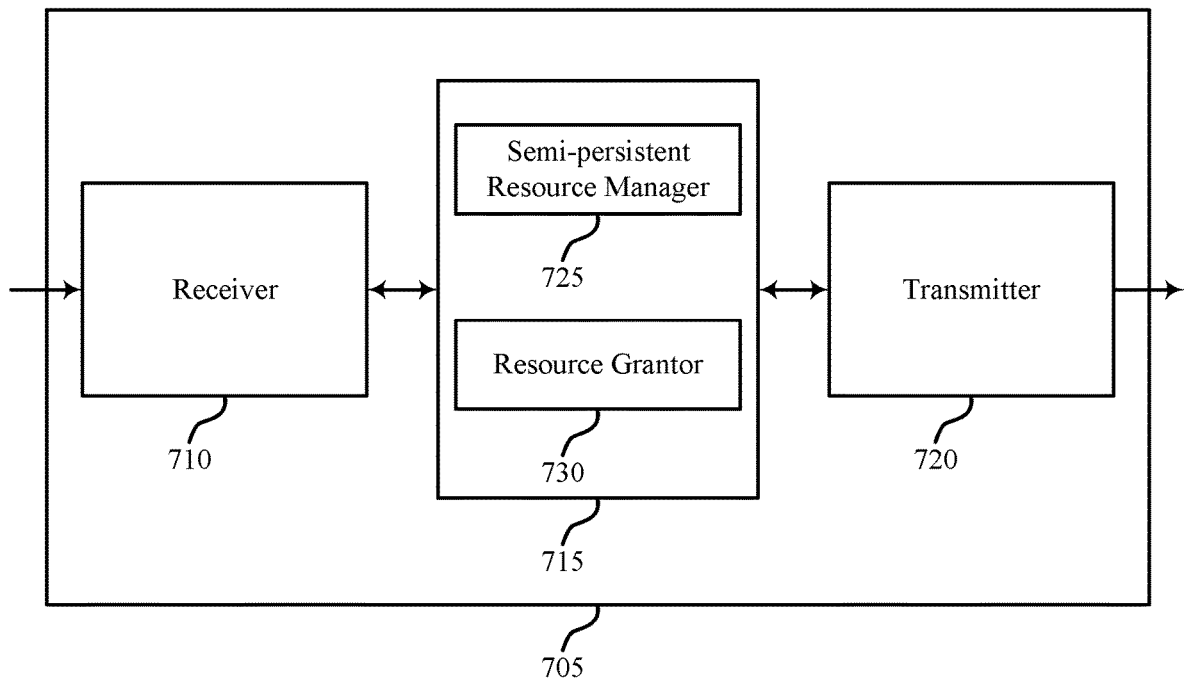

FIG. 7 shows a block diagram 700 of a wireless device 705 that supports traffic-priority-based transmission power fallback for interference mitigation in accordance with various aspects of the present disclosure. Wireless device 705 may be an example of aspects of a wireless device 605 or a base station 105 as described with reference to FIGS. 1 and 6. Wireless device 705 may include receiver 710, power fallback manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to traffic-priority-based transmission power fallback for interference mitigation, etc.). Information may be passed on to other components of the device. The receiver 710 may be an example of aspects of the transceiver 935 described with reference to FIG. 9.

Power fallback manager 715 may be an example of aspects of the power fallback manager 915 described with reference to FIG. 9. Power fallback manager 715 may also include semi-persistent resource manager 725 and resource grantor 730.

Semi-persistent resource manager 725 may identify that a UE in communication with the wireless device is a mission critical UE capable of generating traffic of the first priority. Identifying the semi-persistent resources is based on the UE being a mission critical UE. The semi-persistent resource manager 725 may identify semi-persistent resources reserved for use by traffic of a first priority. The semi-persistent resource manager 725 may transmit a message to the first UE that indicates the semi-persistent resources being reserved for use by traffic of the first priority. The semi-persistent resource manager 725 may identify additional semi-persistent resources based on receiving the second indication. The semi-persistent resource manager 725 may compare the semi-persistent resources reserved for use by traffic of the first priority to a semi-persistent resource threshold based on receiving the indication, where additional semi-persistent resources are not reserved based on the semi-persistent resources satisfying the semi-persistent resource threshold. In some cases, the traffic of the first priority is low-latency traffic.

Resource grantor 730 may transmit an assignment of communication resources in a grant, the communication resources at least partially overlapping with the semi-persistent resources and to be used for traffic of a second priority, the second priority being lower than the first priority. The grant indicates a maximum transmission power for the traffic of the second priority, the maximum transmission power for the traffic of the second priority being less than a transmission power of the traffic of the first priority. The resource grantor 730 may assign one of the set of maximum transmission powers to the traffic of the second priority as part of the grant, where the assigned maximum transmission power is based on an expected reception power of the traffic of the first priority, and reschedule the traffic of the second priority.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
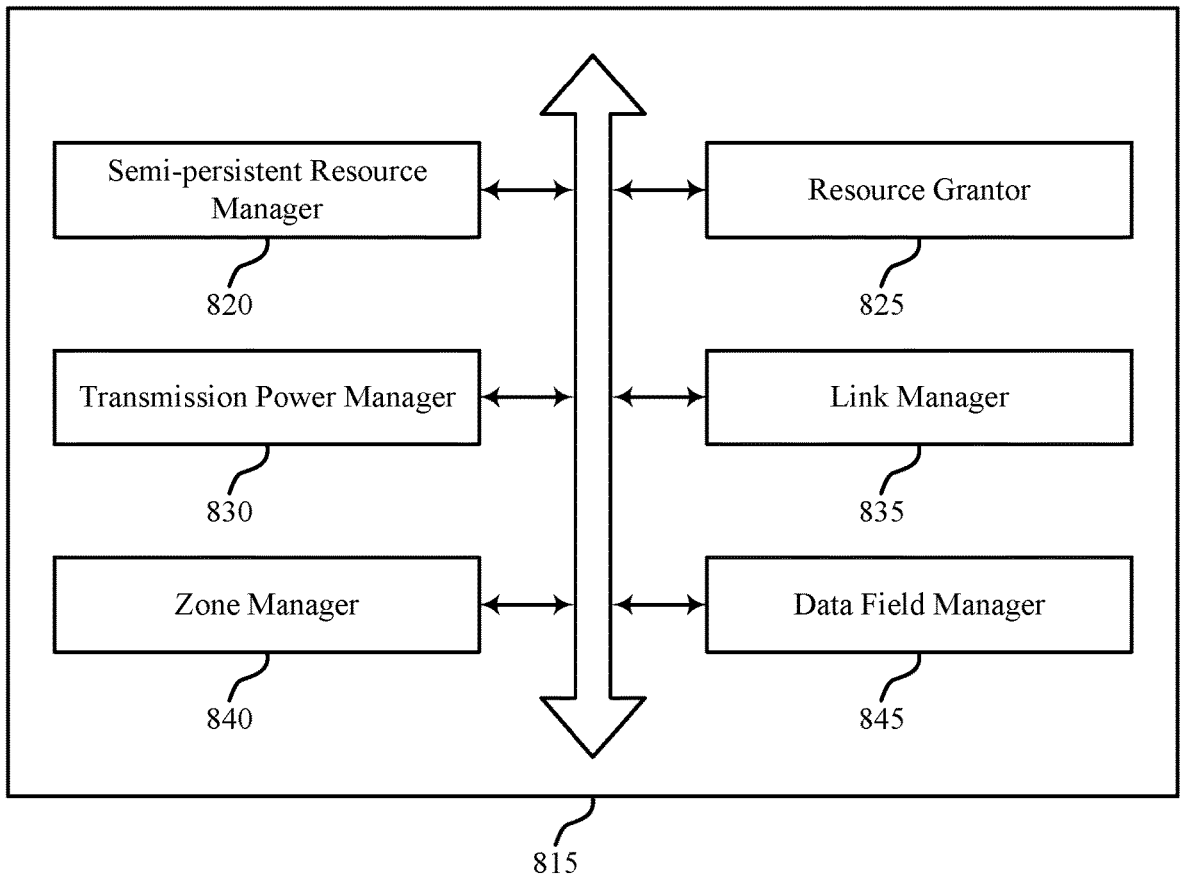

FIG. 8 shows a block diagram 800 of a power fallback manager 815 that supports traffic-priority-based transmission power fallback for interference mitigation in accordance with various aspects of the present disclosure. The power fallback manager 815 may be an example of aspects of a power fallback manager 615, a power fallback manager 715, or a power fallback manager 915 described with reference to FIGS. 6, 7, and 9. The power fallback manager 815 may include semi-persistent resource manager 820, resource grantor 825, transmission power manager 830, link manager 835, zone manager 840, and data field manager 845. Each of these modules may communicate, directly or indirectly, with one another (e.g., via one or more buses).

Semi-persistent resource manager 820 may be an example of the semi-persistent resource manager 725 described with reference to FIG. 7. As such, the semi-persistent resource manager 820 may be capable of performing the functions of the semi-persistent resource manager 725.

Resource grantor 825 may be an example of the resource grantor 730 described with reference to FIG. 7. As such, the resource grantor 825 may be capable of performing the functions of the resource grantor 730.

Transmission power manager 830 may determine the maximum transmission power for the traffic of the second priority to be transmitted when using the communication resources that are at least partially overlapping with the semi-persistent resources based on an expected transmission power of the traffic of the first priority and identify a set of maximum transmission powers associated with the semi-persistent resources.

Link manager 835 may establish a communication link with a UE. The link manager 835 may receive the traffic of the first priority using at least a portion of the communication resources granted to the traffic of the second priority in the grant. The link manager 835 may identify that the traffic of the second priority scheduled to be received using the communication resources that are at least partially overlapping with the semi-persistent resources was not received. The link manager 835 may receive an indication from a first UE that the first UE is capable of generating traffic of the first priority, where identifying the semi-persistent resources occurs after receiving the indication. The link manager 835 may receive a second indication from a second UE that the second UE is capable of generating traffic of the first priority.

Zone manager 840 may divide a coverage area into resources pools based on a UE being capable of generating traffic of the first priority. Zone manager 840 may identify the semi-persistent resources for the resource pool that is associated with the UE.

Data field manager 845 may generate a data field indicating which of the communication resources are the semi-persistent resources reserved for use by traffic of the first priority, transmit, via a physical downlink control channel (PDCCH), the data field to a UE capable of generating traffic of the first priority as part of downlink control information, and transmit the data field to a UE as part of the grant of the communication resources.

Figure 9:
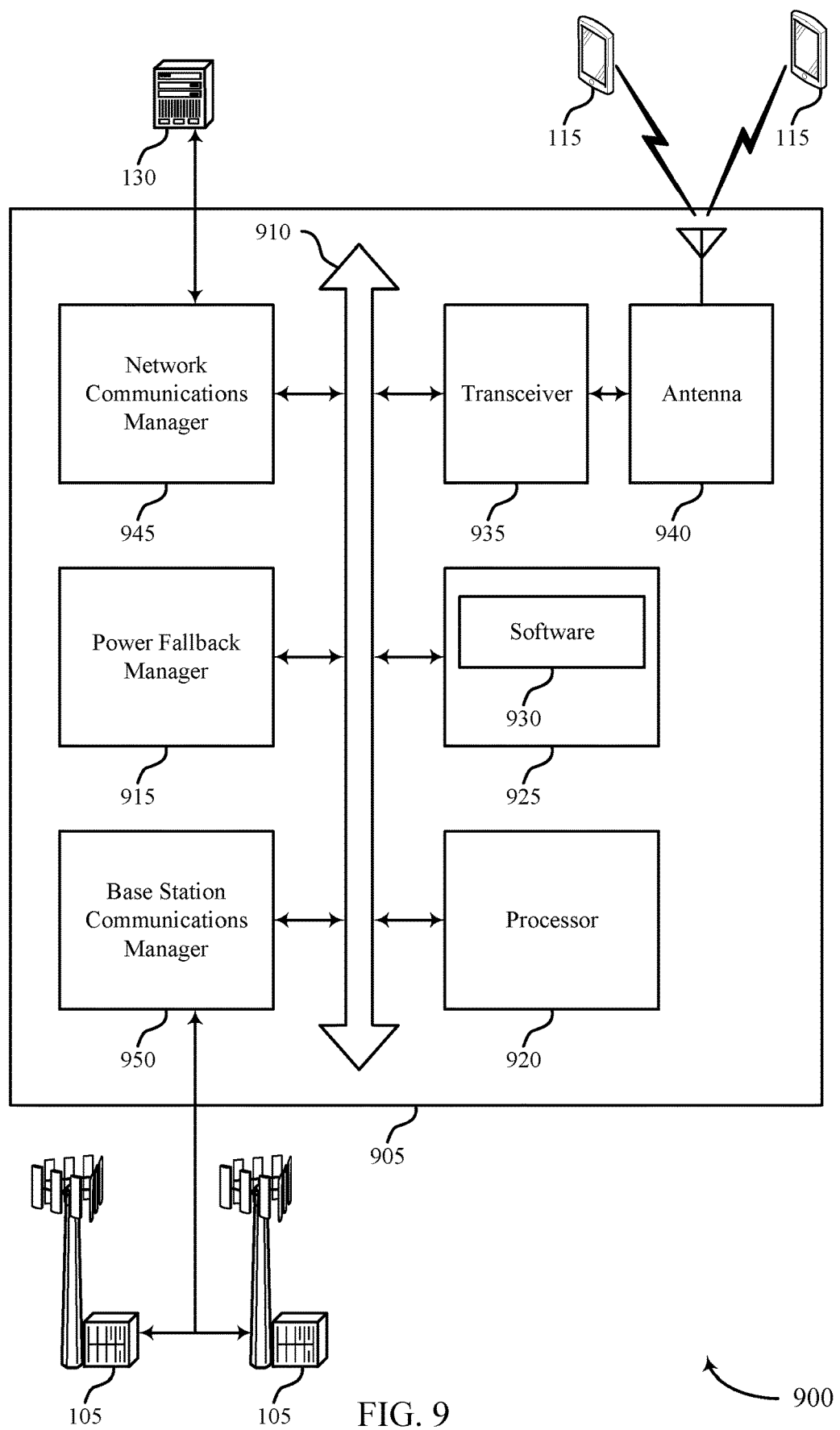
FIG. 9 illustrates a block diagram of a system including a base station that supports traffic-priority-based transmission power fallback for interference mitigation in accordance with aspects of the present disclosure.

FIG. 9 shows a diagram of a system 900 including a device 905 that supports traffic-priority-based transmission power fallback for interference mitigation in accordance with various aspects of the present disclosure. Device 905 may be an example of or include the components of wireless device 605, wireless device 705, or a base station 105 as described above, e.g., with reference to FIGS. 1, 6 and 7.

Device 905 may include components for bi-directional voice and data communications including components for transmitting and receiving communications, including power fallback manager 915, processor 920, memory 925, software 930, transceiver 935, antenna 940, network communications manager 945, and base station communications manager 950. These components may be in electronic communication via one or more busses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting traffic-priority-based transmission power fallback for interference mitigation).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support traffic-priority-based transmission power fallback for interference mitigation. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Base station communications manager 950 may manage communications with other base station 105, and may include a controller or scheduler for controlling communications with UEs 115 in cooperation with other base stations 105. For example, the base station communications manager 950 may coordinate scheduling for transmissions to UEs 115 for various interference mitigation techniques such as beamforming or joint transmission. In some examples, base station communications manager 950 may provide an X2 interface within a LTE/LTE-A wireless communication network technology to provide communication between base stations 105.

Figure 10:
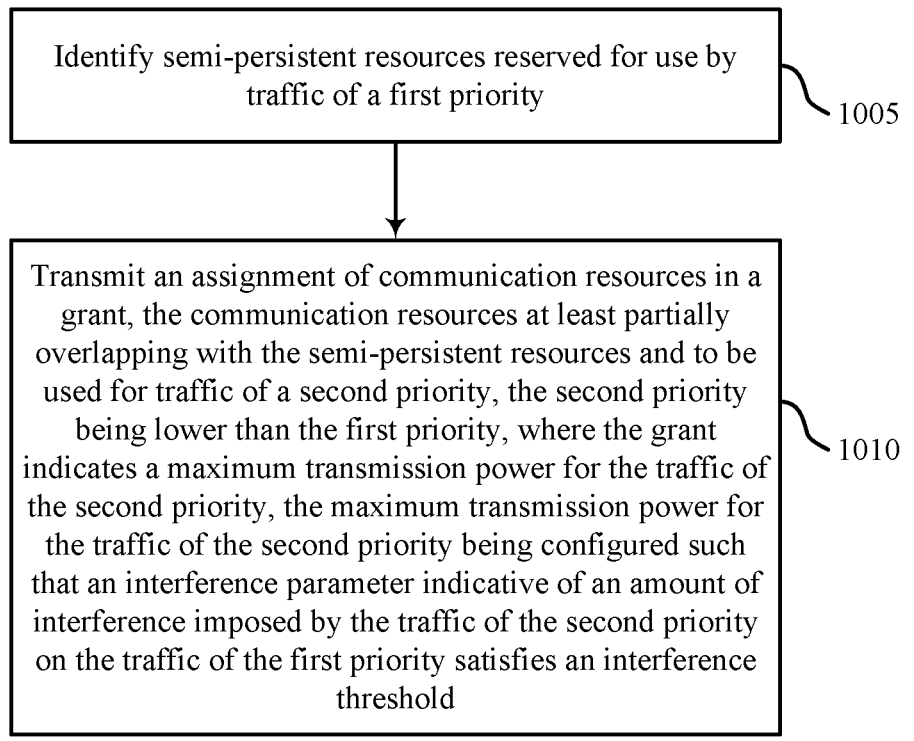
FIGS. 10 through 11 illustrate methods for traffic-priority-based transmission power fallback for interference mitigation in accordance with aspects of the present disclosure.

FIG. 10 shows a flowchart illustrating a method 1000 for traffic-priority-based transmission power fallback for interference mitigation in accordance with various aspects of the present disclosure. The operations of method 1000 may be implemented by a base station 105 or its components as described herein. For example, the operations of method 1000 may be performed by a power fallback manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1005 the base station 105 may identify semi-persistent resources reserved for use by traffic of a first priority. The operations of block 1005 may be performed according to the methods described with reference to FIGS. 1 through 5. In certain examples, aspects of the operations of block 1005 may be performed by a semi-persistent resource manager as described with reference to FIGS. 6 through 9.

At block 1010 the base station 105 may transmit an assignment of communication resources in a grant, the communication resources at least partially overlapping with the semi-persistent resources and to be used for traffic of a second priority, the second priority being lower than the first priority, wherein the grant indicates a maximum transmission power for the traffic of the second priority, the maximum transmission power for the traffic of the second priority being configured such that an interference parameter indicative of an amount of interference imposed by the traffic of the second priority on the traffic of the first priority satisfies an interference threshold. In some examples, the maximum transmission power for the traffic of the second priority may be configured such that a reception power of the traffic of the second priority is less than a reception power of the traffic of the first priority. The operations of block 1010 may be performed according to the methods described with reference to FIGS. 1 through 5. In certain examples, aspects of the operations of block 1010 may be performed by a resource grantor as described with reference to FIGS. 6 through 9.

Figure 11:
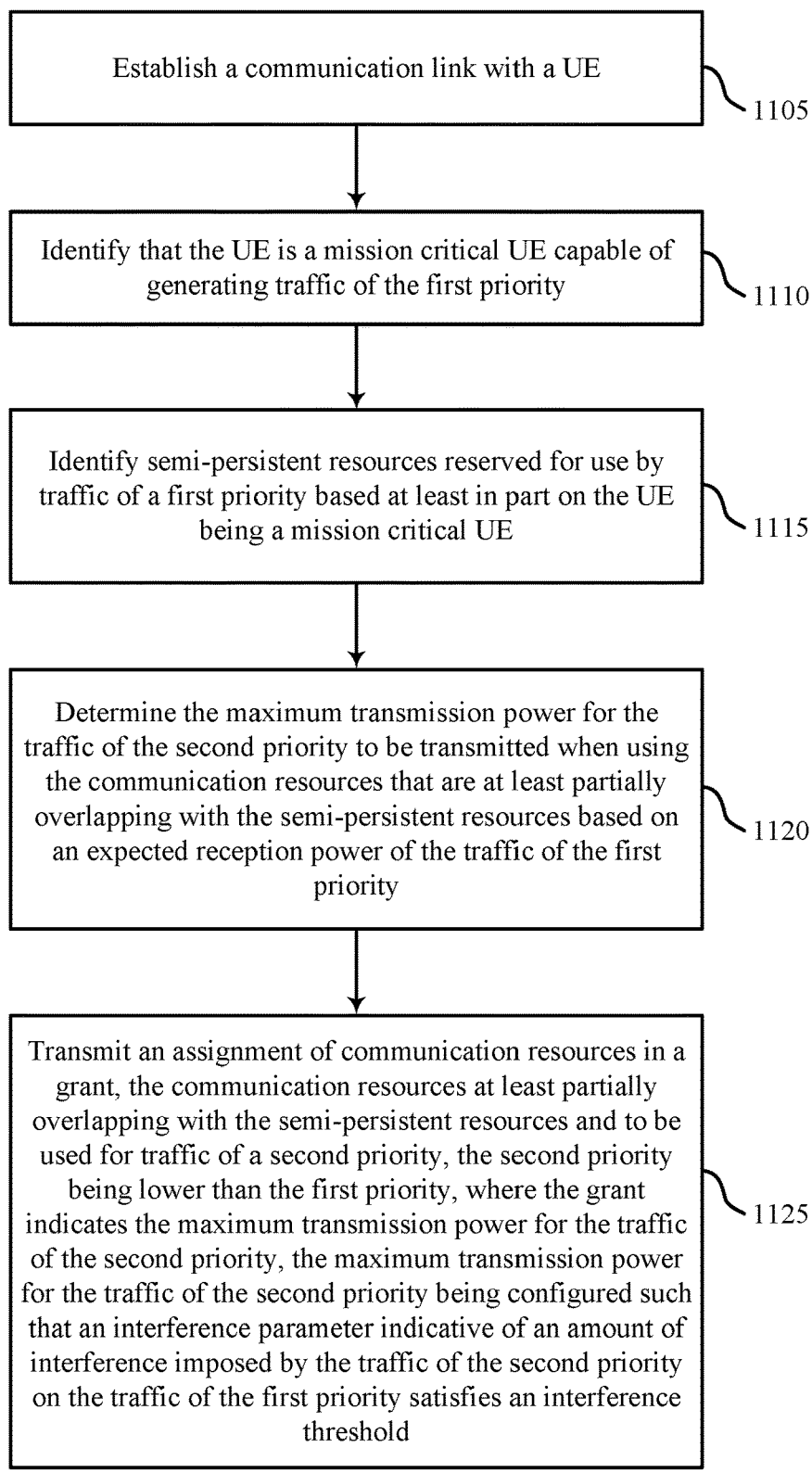

FIG. 11 shows a flowchart illustrating a method 1100 for traffic-priority-based transmission power fallback for interference mitigation in accordance with various aspects of the present disclosure. The operations of method 1100 may be implemented by a base station 105 or its components as described herein. For example, the operations of method 1100 may be performed by a power fallback manager as described with reference to FIGS. 6 through 9. In some examples, a base station 105 may execute a set of codes to control the functional elements of the device to perform the functions described below. Additionally or alternatively, the base station 105 may perform aspects the functions described below using special-purpose hardware.

At block 1105 the base station 105 may establish a communication link with a user equipment (UE). The operations of block 1105 may be performed according to the methods described with reference to FIGS. 1 through 5. In certain examples, aspects of the operations of block 1105 may be performed by a link manager as described with reference to FIGS. 6 through 9.

At block 1110 the base station 105 may identify that the UE is a mission critical UE capable of generating traffic of the first priority. The operations of block 1110 may be performed according to the methods described with reference to FIGS. 1 through 5. In certain examples, aspects of the operations of block 1110 may be performed by a semi-persistent resource manager as described with reference to FIGS. 6 through 9.

At block 1115 the base station 105 may identify semi-persistent resources reserved for use by traffic of a first priority based at least in part on the UE being a mission critical UE. The operations of block 1115 may be performed according to the methods described with reference to FIGS. 1 through 5. In certain examples, aspects of the operations of block 1115 may be performed by a semi-persistent resource manager as described with reference to FIGS. 6 through 9.

At block 1120 the base station 105 may determine the maximum transmission power for the traffic of the second priority to be transmitted when using the communication resources that are at least partially overlapping with the semi-persistent resources based at least in part on an expected reception power of the traffic of the first priority. In some examples, the maximum transmission power may be based at least in part on an expected transmission power of the traffic of the first priority. The operations of block 1120 may be performed according to the methods described with reference to FIGS. 1 through 5. In certain examples, aspects of the operations of block 1120 may be performed by a transmission power manager as described with reference to FIGS. 6 through 9.

At block 1125 the base station 105 may transmit an assignment of communication resources in a grant, the communication resources at least partially overlapping with the semi-persistent resources and to be used for traffic of a second priority, the second priority being lower than the first priority, wherein the grant indicates the maximum transmission power for the traffic of the second priority, the maximum transmission power for the traffic of the second priority being configured such that an interference parameter indicative of an amount of interference imposed by the traffic of the second priority on the traffic of the first priority satisfies an interference threshold. In some examples, the maximum transmission power for the traffic of the second priority may be configured such that a reception power of the traffic of the second priority is less than a reception power of the traffic of the first priority. In some examples, a transmission power of the traffic of the second priority is less than a transmission power of the traffic of the first priority. The operations of block 1125 may be performed according to the methods described with reference to FIGS. 1 through 5. In certain examples, aspects of the operations of block 1125 may be performed by a resource grantor as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000,IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying, by a base station, semi-persistent resources reserved for use by traffic of a first priority;
    transmitting, by the base station, an assignment of communication resources to a user equipment (UE) in a grant, the communication resources at least partially overlapping with the semi-persistent resources and to be used for traffic of a second priority from the UE, the second priority being lower than the first priority, wherein the grant indicates a maximum transmission power for the traffic of the second priority, the maximum transmission power for the traffic of the second priority being configured such that an interference parameter indicative of an amount of interference imposed by the traffic of the second priority on the traffic of the first priority satisfies an interference threshold; and
    receiving the traffic of the second priority at a reception power that is below an expected reception power of the traffic of the first priority when a transmit power associated with the traffic of the second priority is at or below the maximum transmission power indicated by the grant.

2. The method of claim 1, further comprising:
    determining the maximum transmission power for the traffic of the second priority to be transmitted when using the communication resources that are at least partially overlapping with the semi-persistent resources based at least in part on the expected reception power of the traffic of the first priority.

3. The method of claim 1, further comprising:
    establishing a communication link with a second UE; and
    identifying that the second UE is a mission critical UE capable of generating traffic of the first priority, wherein identifying the semi-persistent resources is based at least in part on the second UE being a mission critical UE.

4. The method of claim 1, further comprising:
    identifying a plurality of maximum transmission powers associated with the semi- persistent resources; and
    assigning one of the plurality of maximum transmission powers to the traffic of the second priority as part of the grant, wherein the assigned maximum transmission power is based at least in part on the expected reception power of the traffic of the first priority.

5. The method of claim 1, further comprising:
    dividing a coverage area into resources pools based at least in part on a second UE being capable of generating traffic of the first priority; and
    identifying the semi-persistent resources for the resource pool that is associated with the second UE.

6. The method of claim 1, further comprising:
    receiving the traffic of the first priority using at least a portion of the communication resources granted to the traffic of the second priority in the grant.

7. The method of claim 6, further comprising:
identifying that the traffic of the second priority scheduled to be received using the communication resources that are at least partially overlapping with the semi-persistent resources was not received; and
rescheduling the traffic of the second priority.

8. The method of claim 1, further comprising:
generating a data field indicating which of the communication resources are the semi-persistent resources reserved for use by traffic of the first priority.

9. The method of claim 8, further comprising:
transmitting, via a physical downlink control channel (PDCCH), the data field to the UE, wherein the UE is capable of generating traffic of the first priority as part of downlink control information.

10. The method of claim 8, further comprising:
transmitting the data field to the UE as part of the grant of the communication resources.

11. The method of claim 1, further comprising:
receiving an indication from a second UE that the second UE is capable of generating traffic of the first priority, wherein identifying the semi-persistent resources occurs after receiving the indication.

12. The method of claim 11, further comprising:
transmitting a message to the second UE that indicates the semi-persistent resources being reserved for use by traffic of the first priority.

13. The method of claim 11, further comprising:
receiving a second indication from a third UE that the third UE is capable of generating traffic of the first priority; and
identifying additional semi-persistent resources based at least in part on receiving the second indication.

14. The method of claim 11, further comprising:
comparing the semi-persistent resources reserved for use by traffic of the first priority to a semi-persistent resource threshold based at least in part on receiving the indication, wherein additional semi-persistent resources are not reserved based at least in part on the semi-persistent resources satisfying the semi-persistent resource threshold.

15. The method of claim 1, wherein:
the traffic of the first priority is low-latency traffic.

16. The method of claim 1, further comprising:
determining a zone associated with the semi-persistent resources used for the traffic of the second priority from the UE, wherein transmitting the assignment of communication resources is based at least in part on determining the zone.

17. An apparatus for wireless communication, in a system comprising:
a processor;
memory in electronic communication with the processor; and
instructions stored in the memory and operable, when executed by the processor, to cause the apparatus to:
identify, by a base station, semi-persistent resources reserved for use by traffic of a first priority;
transmit, by the base station, an assignment of communication resources to a user equipment (UE) in a grant, the communication resources at least partially overlapping with the semi-persistent resources and to be used for traffic of a second priority from the UE, the second priority being lower than the first priority, wherein the grant indicates a maximum transmission power for the traffic of the second priority, the maximum transmission power for the traffic of the second priority being configured such that an interference parameter indicative of an amount of interference imposed by the traffic of the second priority on the traffic of the first priority satisfies an interference threshold; and
receive the traffic of the second priority at a reception power that is below an expected reception power of the traffic of the first priority when a transmit power associated with the traffic of the second priority is at or below the maximum transmission power indicated by the grant.

18. The apparatus of claim 17, wherein the instructions are further executable by the processor to:
determine the maximum transmission power for the traffic of the second priority to be transmitted when using the communication resources that are at least partially overlapping with the semi-persistent resources based at least in part on the expected reception power of the traffic of the first priority.

19. The apparatus of claim 17, wherein the instructions are further executable by the processor to:
establish a communication link with a second UE; and
identify that the second UE is a mission critical UE capable of generating traffic of the first priority, wherein identifying the semi-persistent resources is based at least in part on the second UE being a mission critical UE.

20. The apparatus of claim 17, wherein the instructions are further executable by the processor to:
identify a plurality of maximum transmission powers associated with the semi-persistent resources; and
assign one of the plurality of maximum transmission powers to the traffic of the second priority as part of the grant, wherein the assigned maximum transmission power is based at least in part on the expected reception power of the traffic of the first priority.

21. The apparatus of claim 17, wherein the instructions are further executable by the processor to:
divide a coverage area into resources pools based at least in part on a second UE being capable of generating traffic of the first priority; and
identify the semi-persistent resources for the resource pool that is associated with the second UE.

22. The apparatus of claim 17, wherein the instructions are further executable by the processor to:
receive the traffic of the first priority using at least a portion of the communication resources granted to the traffic of the second priority in the grant.

23. The apparatus of claim 22, wherein the instructions are further executable by the processor to:
identify that the traffic of the second priority scheduled to be received using the communication resources that are at least partially overlapping with the semi-persistent resources was not received; and
reschedule the traffic of the second priority.

24. The apparatus of claim 17, wherein the instructions are further executable by the processor to:
generate a data field indicating which of the communication resources are the semi-persistent resources reserved for use by traffic of the first priority.

25. The apparatus of claim 24, wherein the instructions are further executable by the processor to:
transmit, via a physical downlink control channel (PDCCH), the data field to the UE, wherein the UE is capable of generating traffic of the first priority as part of downlink control information.

26. The apparatus of claim 24, wherein the instructions are further executable by the processor to:
   transmit the data field to the UE as part of the grant of the communication resources.

27. The apparatus of claim 17, wherein the instructions are further executable by the processor to:
   receive an indication from a second UE that the second UE is capable of generating traffic of the first priority, wherein identifying the semi-persistent resources occurs after receiving the indication.

28. The apparatus of claim 27, wherein the instructions are further executable by the processor to:
   transmit a message to the second UE that indicates the semi-persistent resources being reserved for use by traffic of the first priority.

29. An apparatus for wireless communication, comprising:
   means for identifying, by a base station, semi-persistent resources reserved for use by traffic of a first priority;
   means for transmitting, by the base station, an assignment of communication resources to a user equipment (UE) in a grant, the communication resources at least partially overlapping with the semi-persistent resources and to be used for traffic of a second priority from the UE, the second priority being lower than the first priority, wherein the grant indicates a maximum transmission power for the traffic of the second priority, the maximum transmission power for the traffic of the second priority being configured such that an interference parameter indicative of an amount of interference imposed by the traffic of the second priority on the traffic of the first priority satisfies an interference threshold; and
   means for receiving the traffic of the second priority at a reception power that is below an expected reception power of the traffic of the first priority when a transmit power associated with the traffic of the second priority is at or below the maximum transmission power indicated by the grant.

30. A non-transitory computer readable medium storing code for wireless communication, the code comprising instructions executable by a processor to:
   identify, by a base station, semi-persistent resources reserved for use by traffic of a first priority;
   transmit, by the base station, an assignment of communication resources to a user equipment (UE) in a grant, the communication resources at least partially overlapping with the semi-persistent resources and to be used for traffic of a second priority from the UE, the second priority being lower than the first priority, wherein the grant indicates a maximum transmission power for the traffic of the second priority, the maximum transmission power for the traffic of the second priority being configured such that an interference parameter indicative of an amount of interference imposed by the traffic of the second priority on the traffic of the first priority satisfies an interference threshold; and
   receive the traffic of the second priority at a reception power that is below an expected reception power of the traffic of the first priority when a transmit power associated with the traffic of the second priority is at or below the maximum transmission power indicated by the grant.

* * * * *